United States Patent [19]

Groth, Jr.

[11] Patent Number: 4,706,093
[45] Date of Patent: Nov. 10, 1987

[54] MONOPULSE TRACKING SYSTEM SUBSTANTIALLY FREE OF EXTERNALLY GENERATED NOISE

[75] Inventor: Edward J. Groth, Jr., Scottsdale, Ariz.

[73] Assignee: Motorola, Inc., Schaumburg, Ill.

[21] Appl. No.: 593,150

[22] Filed: Mar. 26, 1984

[51] Int. Cl.$^4$ .............................................. G01S 5/02
[52] U.S. Cl. ........................................ 342/427; 375/1
[58] Field of Search ................ 343/5 FT, 7.4, 16 LS, 343/16 M, 17.2 PL, 17.2 R, 427, 5 PN, 378, 383, , 384; 375/1; 367/96, 97, 100; 455/278; 342/201, 59, 74–81, 102, 103, 127, 134, 137, 140, 141, 146, 149–158

[56] References Cited

U.S. PATENT DOCUMENTS

| | | | |
|---|---|---|---|
| 2,934,757 | 4/1960 | Hoefer et al. | 342/151 |
| 3,078,453 | 2/1963 | McGillem et al. | 343/16 M |
| 3,156,817 | 11/1964 | Briggs | 343/378 |
| 3,176,295 | 3/1965 | Kirkpatrick et al. | 343/427 |
| 3,344,425 | 9/1967 | Webb | 342/153 |
| 3,346,861 | 10/1967 | Chadwick et al. | 342/153 |
| 3,478,268 | 11/1969 | Coviello | 375/1 |
| 3,728,724 | 4/1973 | Alpers | 343/16 M |
| 3,972,042 | 7/1976 | Johnson | 343/17.2 PC |
| 4,296,415 | 10/1981 | Pelton et al. | 342/149 X |
| 4,443,799 | 4/1984 | Rubin | 342/201 |

FOREIGN PATENT DOCUMENTS 2110035  6/1983  United Kingdom ............. 343/16 M

OTHER PUBLICATIONS

M. Skolnik, *Radar Handbook* (1970, McGraw-Hill), pp. 7-44 to 7-45.
M. Skolnik, *Radar Handbook* (McGraw-Hill, 1970), pp. 21-28 through 21-30.
"Trakx: A Dual-Frequency Tracking Radar", by D. Cross et al., Microwave Journal (9/76), pp. 39-41.

Primary Examiner—Theodore M. Blum
Assistant Examiner—Bernarr E. Gregory
Attorney, Agent, or Firm—Maurice J. Jones, Jr.; Eugene A. Parsons

[57] ABSTRACT

A monopulse tracking system utilizing at least two channels, each of which has a different spreading/despreading pseudo-random noise function associated therewith. In conjunction with a monopulse antenna, one of the channels is utilized to develop a sum signal and the other channel is utilized to develop a difference signal, which sum and difference signals are utilized in a phase detector to generate an error signal. Because different channels are utilized to develop the sum and difference signals, externally generated noise is uncorrelated in the phase detector and, therefore, biases caused by the noise are eliminated.

4 Claims, 3 Drawing Figures

MONOPULSE TRACKING SYSTEM SUBSTANTIALLY FREE OF EXTERNALLY GENERATED NOISE

BACKGROUND OF THE INVENTION

A monopulse tracking system is a relatively well known direction finding or antenna pointing system utilizing a special monopulse antenna having at least two elements situated to receive a signal from a remote source, the direction of which relative to the antenna boresight axis it is desired to determine. The elements of the antenna are situated so that the signal is received in both elements in phase if the antenna is pointing directly at the remote source and the signal is received out of phase in varying amounts in accordance with the amount of error in the direction the antenna is pointing. In general, the two elements of the monopulse antenna provide a single axis of direction and if a second, quadrature axis is desired additional elements must be utilized in the antenna. Typical monopulse antennas are illustrated in U.S. Pat. No. 3,990,078, issued Nov. 2, 1976, entitled Image Element Antenna Array for A Monopulse Tracking System for A Missile, and U.S. Pat. No. 4,309,706, issued Jan. 5, 1982, entitled "Wide Band Direction Finding System".

A major difficulty experienced in prior art monopulse tracking systems is encountered in the presence of externally generated noise. Externally generated noise creates interference in both the sum and the difference channels and generally remain after down conversion, phase detection and filtering. Since the externally generated noise components in the sum and difference channels exhibit common features, there is a correlation of the noise in the phase detector which produces bias errors (DC offset) that cannot be removed by the filtering. The bias errors are developed, even if the link is protected by spread spectrum means because the externally generated noise is spread by the receiver despreading function again producing noise in the sum and difference channels which will correlate in the phase detector because of the use of the common despreading function.

SUMMARY OF THE INVENTION

The present invention pertains to a monopulse tracking system incorporating at least two channels having different carriers and/or utilizing different spreading/despreading functions. One of the channels is utilized to develop a sum signal and the other channel is utilized to develop the difference signal so that externally generated noise present in the reception is substantially uncorrelated in the first and second channels. When the sum and difference signals are supplied to a phase detector the uncorrelated noise does not produce the bias error, or DC offset in the output of the phase detector and, therefore, does not adversely effect the pointing error signal output.

The present invention is especially useful in conjunction with the system disclosed in U.S. Pat. No. 4,494,238 entitled "Multiple Channel Data Link System", issued Jan. 15, 1985 and assigned to the same assignee. That system utilizes a large plurality (up to 20 or more) of channels simultaneously and different subsets of the plurality of channels can be selected to provide sum and difference signals with no common components.

It is an object of the present invention to provide a new and improved monopulse tracking system.

It is a further object of the present invention to provide a new and improved monopulse tracking system substantially uneffected by externally generated noise.

It is a further object of the present invention to incorporate a monopulse tracking system into a multichannel communication system of the type disclosed in the above described patent application entitled "Multiple Channel Data link System".

These and other objects of this invention will become apparent to those skilled in the art upon consideration of the accompanying specification, claims and drawings.

DESCRIPTION OF THE PREFERRED EMBODIMENTS

Figure 1:
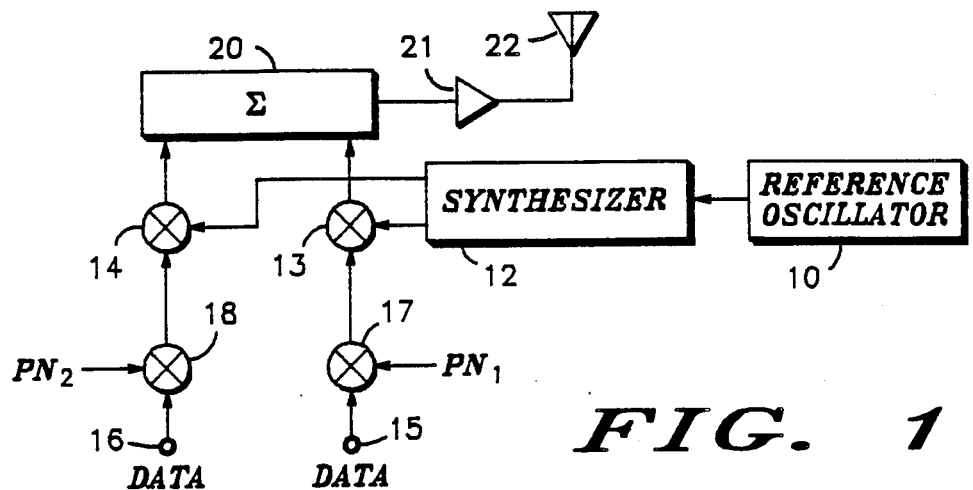
FIGS. 1 and 2 are block diagrams of a two channel transmitter and receiver, respectively, for a monopulse tracking system embodying the present invention.

Referring specifically to FIG. 1, a simplified block diagram of a transmitter capable of transmitting two different coherently related signals is illustrated. The transmitter includes a reference oscillator 10 which supplies a reference signal to a frequency synthesizer 12. Synthesizer 12 provides two coherently related, selected carriers, one each, to two mixers 13 and 14. Data may be supplied at each of two input terminals 15 and 16, which terminals are connected to inputs of two mixers 17 and 18. Spreading signals $PN_1$ and $PN_2$ are also supplied to inputs of mixers 17 and 18, respectively. The mixed spreading and data signals from each of the mixers 17 and 18 are supplied to a second input of the mixers 13 and 14, respectively. The modulated carriers from the mixers 13 and 14 are supplied to a combining circuit 20 where they are combined into a single signal which is amplified in a power amplifier 21 and transmitted through an antenna 22. It will be understood by those skilled in the art that the simplified block diagram of FIG. 1 is essentially a flow chart and that a great variety of apparatus might be utilized to provide a transmission including two coherently related but differing signals. In this embodiment the signals differ by carrier frequency and by the spreading function but it will be understood presently that any single difference in the two channels which allows the subsequent separation thereof may be sufficient to perform the functions of this invention.

Figure 2:
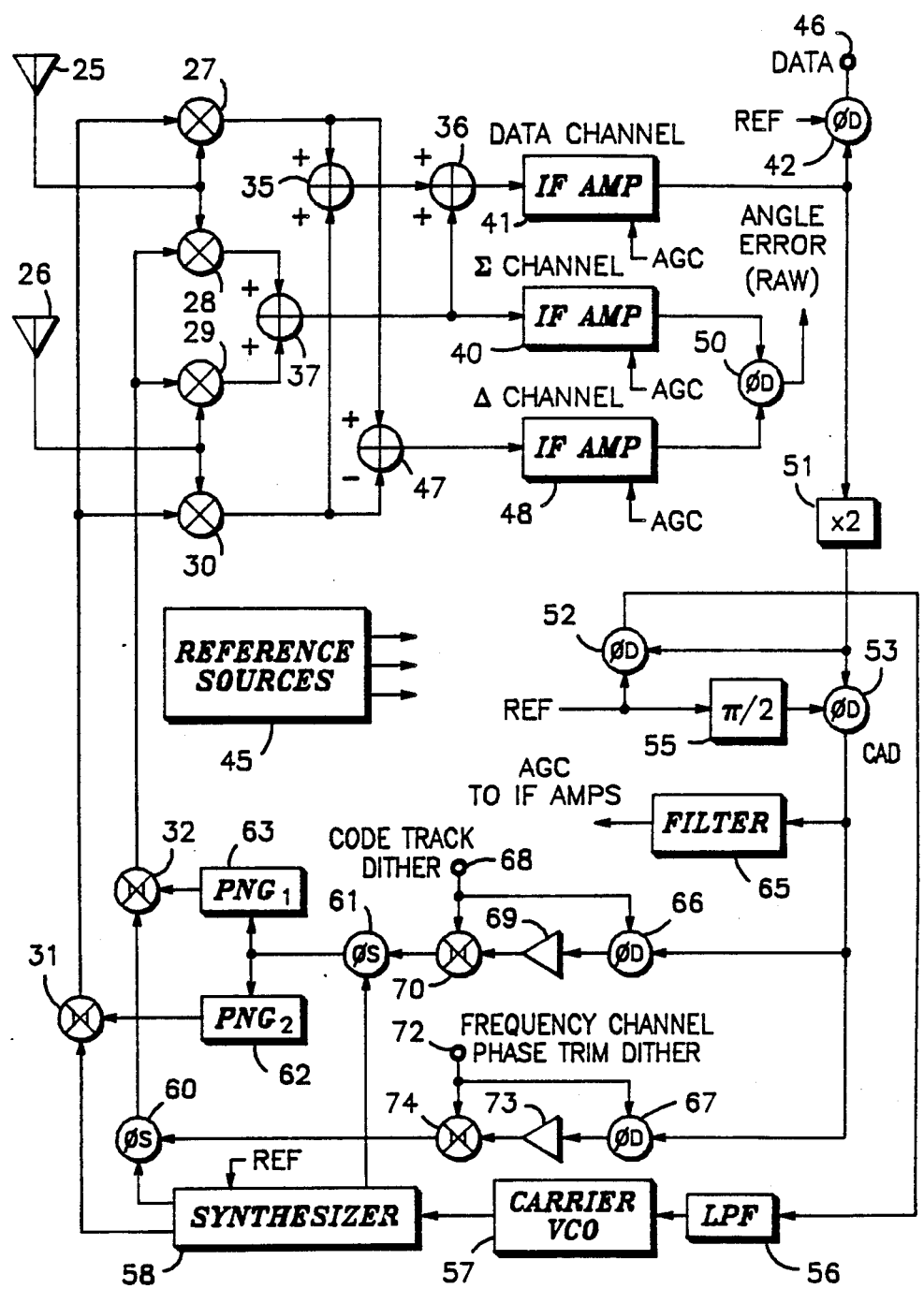

Referring specifically to FIG. 2, a block diagram of a dual channel receiver is illustrated, which receiver is designed to receive the dual channel signal transmitted by the transmitter of FIG. 1. A monopulse antenna having two elements 25 and 26 each receive the entire two channel signal from the transmitter. Antenna 25 is connected to an input of each of a pair of mixers 27 and 28. Antenna 26 is connected to an input of each of a pair of mixers 29 and 30. Second inputs of mixers 27 and 30 are connected to the output of a modulator 31 and second inputs of mixers 28 and 29 are connected to the output of a modulator 32. The outputs of mixers 27 and 30 are added together in a summing device 35, the output of which is supplied to a first input of a summing device 36. The outputs of mixers 28 and 29 are added together in a summing device 37, the output of which is supplied to a second input of summing device 36 and to an input of an IF amplifier 40. The output of summing device 36 is supplied to an input of an IF amplifier 41. The output of amplifier 41 is supplied to a phase detector 42, which also has a reference signal supplied thereto from a reference source 45, with the output of phase detector 42 being connected to an output terminal 46 where any data transmitted will appear. The outputs of mixers 27 and 30 are combined negatively in a summing device 47, the output of which is supplied to an IF amplifier 48. The signal supplied by the IF amplifier 40 is the sum signal which is supplied to the reference input of a phase detector 50. The signal from the IF amplifier 48 is the difference signal which is supplied to a second input of phase detector 50 and the output of phase detector 50 is the angle error, or pointing error, of the monopulse antenna. It will of course be understood by those skilled in the art that the error signal from the phase detector 50 is in a single axis and if a second axis is desired a second set of antenna elements and associated electronics must be supplied.

The output signal from data channel IF amplifier 41 is also utilized to close a tracking loop to maintain the receiver on the desired frequencies. The output signal from amplifier 41 is supplied through a multiply by 2 circuit 51 to a first phase detector 52 and a second phase detector 53. A reference signal from reference source 45 is supplied directly to a second input of phase detector 52 and through a 90° phase shift circuit 55 to a second input of phase detector 53. The output of phase detector 52 is supplied through a low pass filter 56 to the control input of a voltage controlled oscillator (VCO) 57. VCO 57 supplies a signal to a synthesizer 58 which supplies two local oscillator output signals for down converting the received signals at antennas 25 and 26. One of the carrier signals from synthesizer 58 is supplied directly to an input of modulator 31 and a second carrier is supplied through a phase shifter 60 to an input of modulator 32. The two carriers from synthesizer 58 are coherently related because they are both generated from VCO 57. A timing signal is also generated by synthesizer 58 and supplied through a phase shifter 61 to control inputs of first and second pseudo random noise generators 62 and 63, respectively. The generators 62 and 63 supply despreading functions to modulators 31 and 32, respectively. Thus, the first and second carriers with the despreading functions modulated thereon are supplied to appropriate mixers 27 through 30 so that each of the mixers down converts only one or the other of the transmitted signals to the IF frequency.

The quadrature signal from the phase detector 53 is supplied through a filter 65 to automatic gain control inputs in each of the IF amplifiers 40, 41 and 48. Also, the output from the phase detector 53 is applied to a first phase detector 66 and to a second phase detector 67. The phase detector 66 receives a dithering signal from an input terminal 68. The output of the phase detector 66 is amplified in an amplifier 69 and supplied to a modulator 70, which is also dithered by the signal on input terminal 68. The final signal from modulator 70 is supplied to the phase shifter 61 to adjust the phase of the timing signal supplied to PN generators 62 and 63. Similarly a dithering signal appearing at an input terminal 72 is supplied to a second input of phase detector 67 and the dithered output signal is amplified in an amplifier 73 and applied to an input of a modulator 74. The dithering signal at input terminal 72 is also supplied to the modulator 74 and the output signal from modulator 74 is applied to a control input of phase shifter 60 to adjust the phase of the carrier supplied therethrough to modulator 32. Small, slow phase variations which occur between channels must be corrected to reduce the effects on output data at terminal 46 and error signals from phase detector 50. These slow phase variations may be caused by phase shifts due to path length effects at the different carrier frequencies, thermal shifts within the equipment and long term shifts in hardware values, etc. The channels must remain coherently related so that the IF signals supplied to the IF amplifiers 40, 41 and 48 after down conversion are essentially similar except for the phase differences which provide for the desired information. The phase shifters 60 and 61 and their associated circuitry perform the function of removing the unwanted phase variations. The operation of this circuitry is described in more detail in U.S. Pat. No. 4,494,238, entitled "Multiple Channel Data Link System", issued Jan. 15, 1985 and assigned to the same assignee.

In the operation of the apparatus of FIG. 2 it can be seen that the signals received at antennas 25 and 26 are essentially divided into two channels by the two carriers and two despreading functions available from modulators 31 and 32. The carrier and despreading function provided by modulator 32 is utilized in mixers 28 and 29 to produce a sum signal for the monopulse tracking portion of the invention. The carrier and despreading function provided by modulator 31 is utilized in mixers 27 and 30 to provide a difference signal for the monopulse tracking portion of the invention. The sum and difference signals are utilized in phase detector 50 to provide a pointing or tracking error signal. This error signal may be utilized to drive an antenna angular servo or for other driving or guidance functions well known to those skilled in the art. Since the carriers in each of the channels are different and the despreading functions are different it is evident that any externally generated noise appearing in either of the channels will be orthogonal to that from the other frequency channel. Hence there is no correlation of the externally generated noise in the sum and difference channels. Because the noise in each of the channels is uncorrelated the usual biases will not arise in the output of phase detector 50 and the mean value of the tracking error due to the externally generated noise will be zero. It will of course be understood by those skilled in the art that the different carriers in the channels will have a substantial effect on decorrelating externally generated noise. Also, the different despreading functions will substantially decorrelate externally generated noise in the two channels. Therefore, those skilled in the art may utilize one or both of these differences, or other differences which may be devised to insure that externally generated noise is uncorrelated in the sum and difference channels so that the mean value of the externally generated noise in the phase detector is essentially zero, or reduced to a workable amount.

Figure 3:
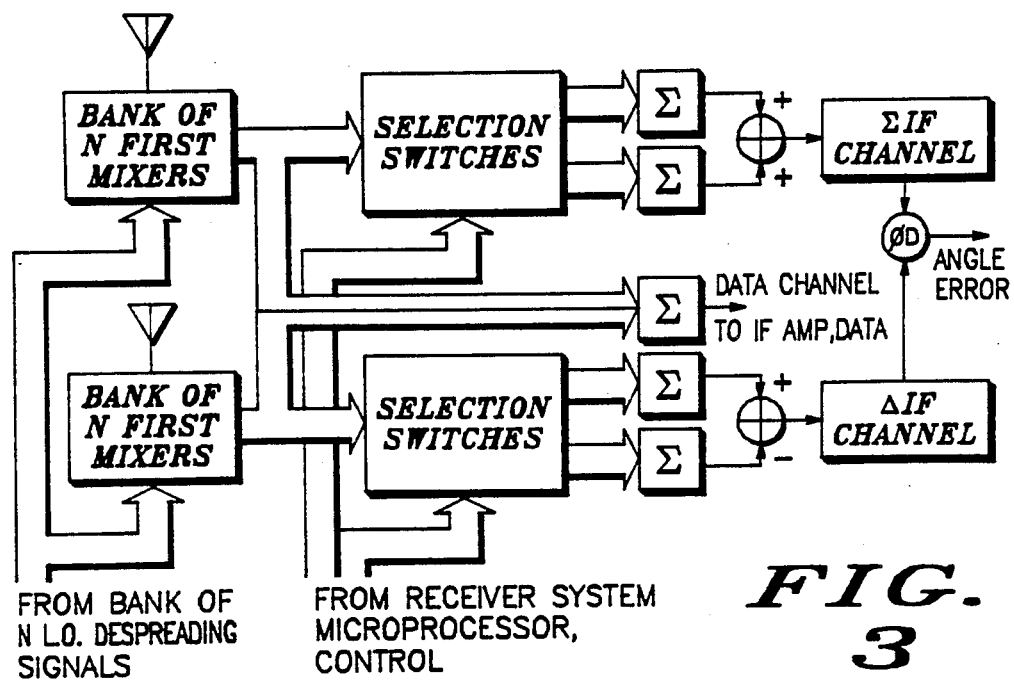
FIG. 3 is a simplified block diagram of a monopulse tracking system incorporating essentially any plurality of channels and embodying the present invention.

While the simplified system of FIGS. 1 and 2 will operate effectively it is anticipated that the most useful embodiment of the present invention is one in which the monopulse tracking system is incorporated into a multichannel communications system and specifically the system disclosed in the above described copending patent application entitled "Multiple Channel Data Link System", which system is incorporated herein by reference. Referring specifically to FIG. 3, a monopulse tracking system is disclosed which is similar to that disclosed in FIG. 2. In FIG. 3 a larger plurality of channels is provided. Specifically, a system such as disclosed in the above described co-pending application entitled "Multiple Channel Data Link System" might be utilized as a monopulse tracking system in accordance with the block diagram, or flow chart, illustrated in FIG. 3. In such a system several channels, or subsets of channels, are utilized to develop each of the sum and difference signals and the specific subsets, or channels, selected might be alternated in accordance with the instantaneous operation thereof. That is specific channels in each subset are selected for signal quality and minimum interference, and specific subsets are selected to provide sum and difference signals with no common components. The channel selection process is described in detail in the referenced copending application. In the embodiment of FIG. 3 all of the channels are coherently related so that when they are down converted to IF they will all be at the same frequency.

Therefore an improved monopulse tracking system is disclosed wherein at least two separate channels are utilized to develop the separate sum and difference signals required for monopulse tracking. Because the two channels are different in carrier and/or spreading/despreading functions, any externally generated noise which is present in both channels will be uncorrelated in the sum and difference signals and the mean value thereof in the ouput of the phase detection step will be essentially zero.

While I have shown and described two specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. A monopulse tracking system comprising:
   a first channel having a first carrier;
   a second channel having a second carrier coherently related to said first carrier and at a different frequency;
   monopulse antenna means for receiving first and second signals transmitted at the first and second carriers, respectively;
   first means coupled to said first channel and to said monopulse antenna for receiving the first signal and providing a sum signal therefrom;
   second means coupled to said second channel and to said monopulse antenna for receiving the second signal and providing a different signal therefrom;
   means for supplying a different despreading function to each of said first and second channels; and
   a phase detector coupled to said first and second means to receive the sum and difference signals and provide an error signal substantially free of biases due to externally generated noise correlating in the first and second channels.

2. A monopulse tracking system comprising:
   a transmitter transmitting two different coherently related signals, including different spreading functions, as a single signal;
   a monopulse antenna having at least two elements each of which elements is designed to receive the single signal;
   first means coupled to said monopulse antenna and including a despreading function for one of the two different signals for receiving the one of the two different signals from each of the two elements of said antenna and providing a sum signal therefrom;
   second means coupled to said monopulse antenna and including a despreading function for the other of the two different signals for receiving the other of the two different signals from each of the two elements of said antenna and providing a difference signal therefrom; and
   a phase detector coupled to receive the sum and difference signals and provide an error signal substantially free of biases due to correlating externally generated noise in the sum and difference signals.

3. A method substantially reducing the effects of externally generated noise in a monopulse tracking system comprising the steps of:
   differentiating two coherently related signals by spreading the two signals with different spreading functions;
   transmitting the two different coherently related signals as a single signal:
   receiving the single signal on a monopulse antenna;
   separating and despreading one of the different signals in the single signal received on the monopulse antenna and generating a sum signal therefrom;
   separating and despreading the other of the different signals in the single signal received on the monopulse antenna and generating a difference signal therefrom; and
   combining the sum and difference signals to develop an error signal.

4. A method of substantially reducing the effects of externally generated noise in a monopulse tracking system comprising the steps of:
   transmitting a plurality greater than two of different coherently related signals as a single signal;
   receiving the single signal on a monopulse antenna;
   selecting a plurality of different subsets of the plurality of different signals;
   separating one of the different subsets in the single signal received on the monopulse antenna and generating a sum signal therefrom;
   separating a second of the different subsets in the single signal received on the monopulse antenna and generating a difference signal therefrom; and
   combining the sum and difference signals to develop an error signal.

* * * * *